April 25, 1939.  W. J. RUSSELL ET AL  2,156,216
BROILER AND FRYER UNIT
Filed Feb. 13, 1937   3 Sheets-Sheet 1

WITNESSES:

INVENTORS
Kenneth L. Woodman &
William J. Russell.
BY
ATTORNEY

April 25, 1939. W. J. RUSSELL ET AL 2,156,216
BROILER AND FRYER UNIT
Filed Feb. 13, 1937  3 Sheets—Sheet 2
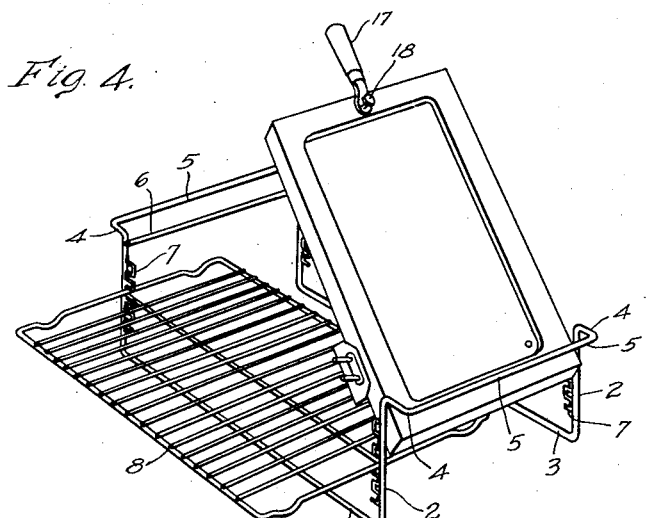
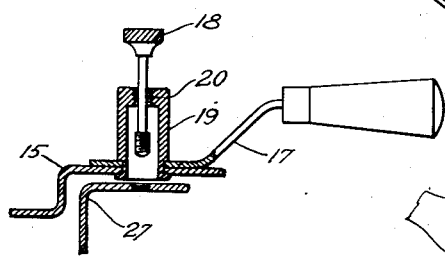
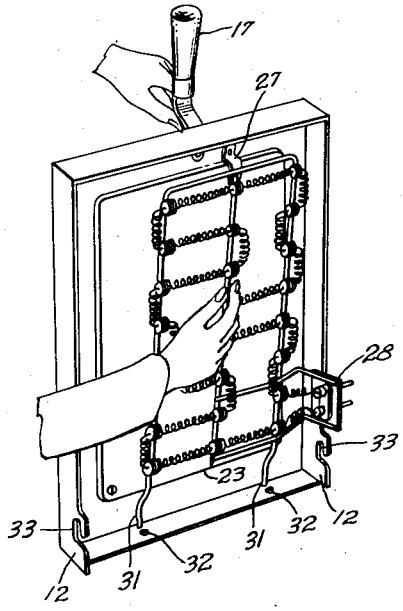
WITNESSES:
INVENTORS
Kenneth L. Woodman &
William J. Russell.
BY
ATTORNEY April 25, 1939.  W. J. RUSSELL ET AL  2,156,216
BROILER AND FRYER UNIT
Filed Feb. 13, 1937  3 Sheets-Sheet 3

WITNESSES:
C. J. Weller.
H. L. Hepler.

INVENTORS
Kenneth L. Woodman &
William J. Russell.
BY
W. R. Coley
ATTORNEY

Patented Apr. 25, 1939

2,156,216

UNITED STATES PATENT OFFICE 2,156,216

BROILER AND FRYER UNIT

William James Russell and Kenneth L. Woodman, Mansfield, Ohio, assignors to Westinghouse Electric & Manufacturing Company, East Pittsburgh, Pa., a corporation of Pennsylvania Application February 13, 1937, Serial No. 125,598

22 Claims. (Cl. 219—35)

REISSUED

SEP 8 1942

Our invention relates to cooking appliances and more particularly to a removable broiler-grill or broiling and frying unit to be used within a roaster or the like.

In roasters known to the art, it has been impossible to broil and fry due to the absence of a suitable cooking surface and heating means. It is, therefore, an object of our invention to provide a heating unit which will be capable of being used within a roaster, and which will have a cooking surface and an open heating coil permitting frying upon such surface and broiling of meats placed within the roaster.

A further object of our invention is to provide means whereby the heating member may be swingably and removably mounted within the roaster.

A further object of our invention is to provide means whereby a tray may adjustably be mounted under the heating member and within the roaster.

A further object of our invention is to provide a simple, inexpensive, rugged rack, removable tray, and heating member, which will be sturdy and not easily damaged.

Other objects of our invention will either be pointed out specifically in the course of the following description of a device embodying our invention, or will be apparent from such description.

In practicing our invention, we provide, in combination, a roaster, a rack having a plurality of tray supports thereon, a heating member comprising a heating element and a heat shield including a cooking surface and a heat reflecting surface, a plurality of hinge portions carried by the heat shield for operative engagement with the rack, and a suitable tray which may be located on the rack.

Referring to the drawings,

Fig. 4 is a perspective view of the structure shown in Fig. 1 with the heater unit in an inclined position and the tray member partially removed;

Fig. 5 is a perspective view of the heater unit illustrating the method of removing the heating element therefrom;

Fig. 10 is an enlarged fragmentary view of the fastening device shown in Fig. 1.

Figure 1:
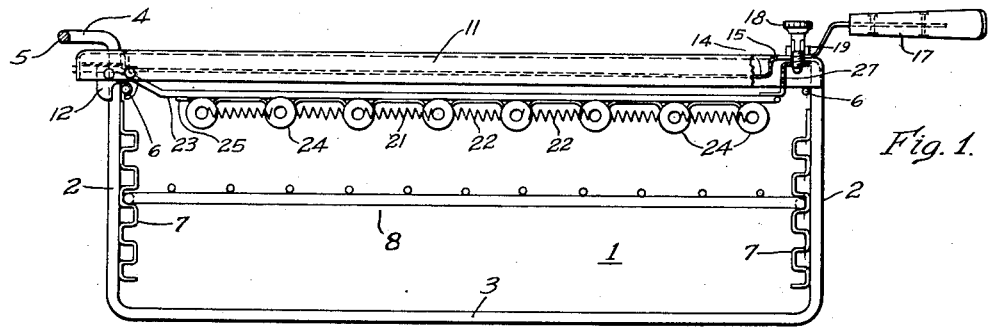
Figure 1 is an elevational and partial sectional view of the rack and heater unit embodied in our invention.
Figure 2:
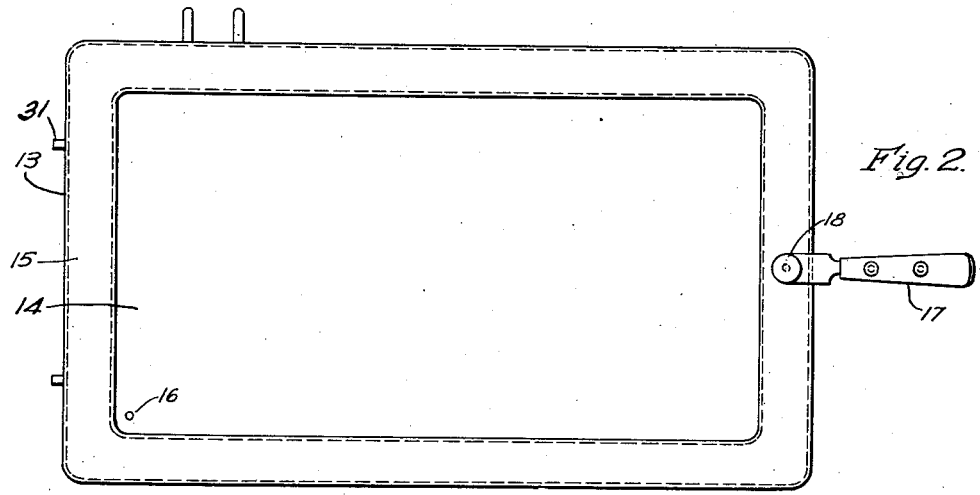
Fig. 2 and Fig. 3 are, respectively, a top view and a bottom view of the heater unit shown in Fig. 1.

Referring to Figs. 1 and 4, we show a rack 1 comprising upstanding support members 2, and longitudinal base members 3. An off-set portion 4 may be located at the upper portion of the upstanding support members 2 and may have a transverse rod 5 which may be used as a bail or handle for lifting and carrying the rack, rigidly attached to the ends of such portions and joining two end support members. Any suitable broiling tray or shelf 8 may be adjustably supported on serpentine tray supporting members 7 which may be rigidly attached to the inner side of the respective upstanding members 2. As shown in Fig. 4, the tray or shelf 8 is in the form of a grill or grid, comprising a rectangular frame and a plurality of spaced transverse bars. A bar 6 may be located intermediate each serpentine tray support 7 and the outward off-set portion 4 and may be rigidly attached to the upstanding support members 2 in any suitable manner.

A removable heater unit 11, comprising a downwardly flanged heat shield 13 and a heating element 21 may be swingably mounted upon the rack 1, about one of the intermediate bars 6, by means of hinge portions 12. The hinge portions 12 may be located at one end of the heat shield 13 and may have located therein an L-shaped aperture which receives the intermediate bar 6, permitting the heater unit 11 to swing thereon. The other end of the heater unit is adapted to rest directly on the bar 6 at the other end.

Figure 3:
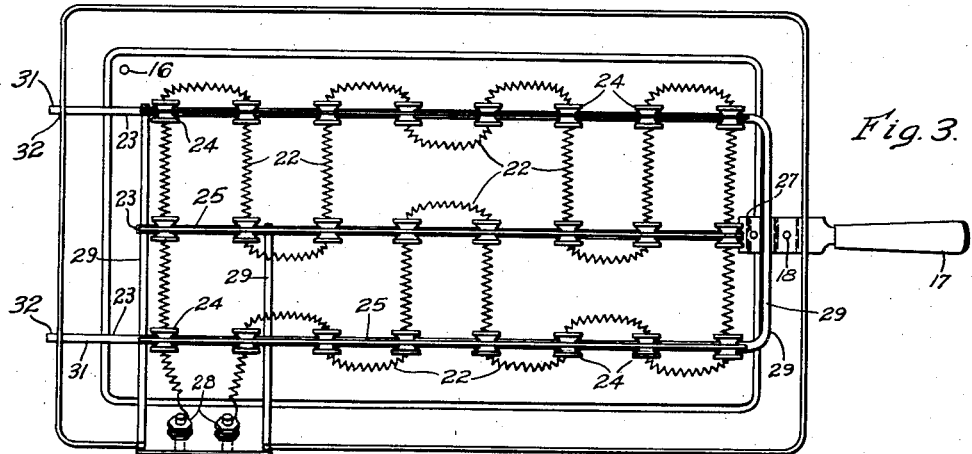
Figure 6:
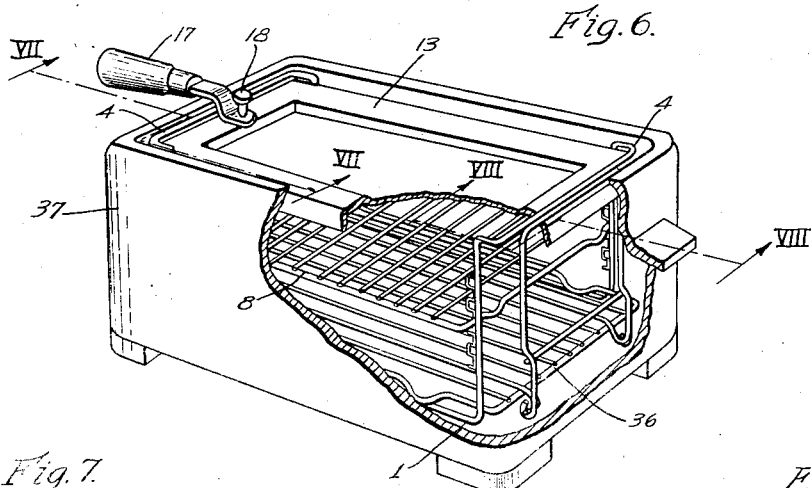
Fig. 6 is a perspective and partial sectional view of a roaster with a trivet rack, and the rack and heater unit embodied in our invention.

The heat shield 13 may have a dished portion 14 therein with an embossed or rim portion 15 about the edge thereof. The top surface of the dished portion 14 of the heat shield 13 may be used as a cooking surface (particularly for frying) while the under portion of such heat shield may function as a heat reflector. An aperture 16 may be located in one corner of the dished portion 14 or in any other desirable position to permit the draining of excess juices from the cooking surface. As shown in Fig. 3, the aperture 16 is spaced from the heating element 21 so that dripping of juices or other liquid on the heating element is avoided. A handle 17 may be rotatably attached to the heater unit 11 by means of a cylindrical collar 19 to facilitate the operator swinging the unit about the intermediate bar 6 or removing the heater unit.

The heating element 21 may be removably attached to the under portion of the heat shield 13 by means of a plurality of apertures 32 located at one end of said heat shield and a set screw 18 located at the other end of the heat shield and extending through the cylindrical collar 19. The heating element 21 comprises a heating coil 22 and may be provided with a plurality of longitudinal members 23, and a plurality of transverse members 29. The heating coil 22 may be insulatedly attached to the longitudinal support members 23 by means of insulating grommets 24 which may be rigidly attached to the support members 23 by means of auxiliary support members 25. The heating coil 22 may terminate in any desirable plug or attachment 26, which enables such coil to be connected to a suitable power supply, not shown.

The outside longitudinal support members 23 of heating element 21 may have extended portions 31 angularly displaced from the plane of such heating element 21. These extended portions may engage the apertures 32 in one end of the heat shield 13 to aid in rigidly attaching the heating element 21 to such heat shield. An angular depending bracket 27 may be rigidly attached to the heating element 21 at the opposite end thereof and may have a threaded aperture therein which may engage the set screw 18 and rigidly attach the heating element 21 to the heat shield while the extended portions 31 are located within the apertures 32.

Set screw 18, which has merely the lower portion thereof threaded, may be located within the cylindrical collar 19, which attaches the handle 17 to the rim portion 15 of the heat shield 13, and which has only an upper or lip portion 20 thereof threaded. Thus, when the set screw is not operatively associated with the angular bracket 27 of the heating element 21, such set screw will slide freely within the cylindrical collar 19 without becoming disengaged therefrom. It is, therefore, obvious that set screw 18 may be removed from the heating element 21 without becoming disengaged from the heat shield 13, which, in turn ensures such set screw will not become misplaced or lost.

The heating element 21 may be removed from the heat shield 13 to permit the operator to clean the heat shield without injuring the heating element by backing off the set screw 18 with one hand, and as such set screw releases the angular bracket 27 the heating element 21 may be angularly displaced from such heating shield with the other hand as illustrated in Fig. 5. To remount the heating element 21 on the heat shield 13 the extended portions 31 of the longitudinal support members 23 are inserted within the apertures 32 and set screw 18 is run down into the angular bracket 27, pulling such bracket and the heating element 21 tightly against the underside of such heat shield. The heater unit 11 comprising the heating coil 21 and heat shield 13 may then be swingably mounted upon the intermediate bar 6 of the rack 1 by placing the L-shaped apertures of the hinge portions 12 about such intermediate bar. In such a position the handle 17 may be grasped and the heater unit 11 may then be swung outwardly until the outer portion of the heat shield 13 contacts the transverse bar 5. While in such a position the heater unit 11 will remain substantially in a vertical position. By grasping the handle 17 and swinging the heater unit 11 downwardly, such unit will rotate until the free end thereof will contact the second intermediate bar 6 and remain substantially in a horizontal position.

Figure 7:
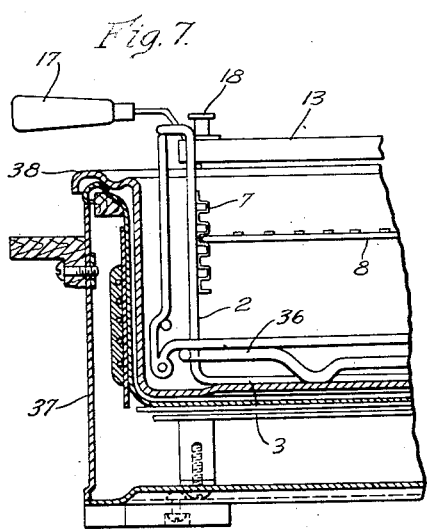
Figs. 7 and 8 are, respectively, partial sectional views taken along lines VII—VII and lines VIII—VIII of Fig. 6.
Figure 8:
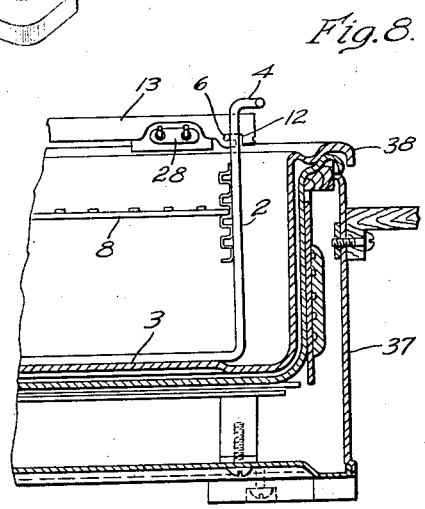

The rack 1, in combination with the heater unit 11, may be operatively associated with a roaster 37 as shown in Figs. 6, 7, 8 and 9. The rack 1 may or may not be used in conjunction with the trivet rack 36 of the roaster 37, as shown in Figs. 7 and 8. While being used with the trivet rack 36 the rack 1 is inserted within such trivet rack and the heater unit 11 is substantially on a plane with the opening of such roaster. However, if it is desired to use the roaster for baking purposes only, the heater unit 11 may be removed from the rack 1 and the broiling tray 8 may be located at the upper portion of the serpentine support 7. A portion of the material to be baked may be placed upon the trivet rack 36 and the balance of the material to be baked may then be placed upon the tray 8. Due to the flexibility of adjusting the height of such tray 8, the location of the upper baking material may be an arbitrary factor permitting the tray 8 to be located at the desired position on the support 7, which will result in an even heat distribution about the upper and the lower baking material. Then should it be desirable to brown the top of the baked goods, such as a pie or beans, it only becomes necessary to replace the heater unit 11 in its horizontal position upon rack 1.

If it is desired to use the broiler or heater unit 11 for broiling or frying purposes alone, the rack 1 may be located within the roaster 37 without the presence of the trivet rack 36. The heater unit 11 may then be swung upwardly into its substantially vertical position and the tray 8 may be located at the desired position upon the serpentine support 7. As will be noted from the drawings, particularly Figs. 1 and 8, the adjacent rod 5 engages the heater unit to retain it in substantially vertical position when it is swung in opening direction slightly past vertical position or dead center. The food to be cooked is then placed upon such tray and the heater unit 11 is then lowered to its substantially horizontal position and the heating coil 21 then connected to a suitable power supply, not shown.

Grease spatterings while broiling will be avoided due to the location of the rack 1 within the roaster 37 and the presence of the heater unit 11 over the cooking material. The smoking which accompanies broiling will likewise be reduced due to the clearance between the heater unit and the familiar inset pan 38 which permits a small circulation of air.

To remove or inspect the broiled food it is only necessary to swing the heater member to its substantially vertical position when such food becomes readily accessible. The lower surface of the heat shield 13 will reflect a large portion of the heat radiated from the heating coil 21 and thus increase the operating efficiency of such coil or reduce the time required for a satisfactory broiling operation.

Whenever desired, the upper surface of the recessed portion 14 may be used as a grill or cooking surface upon which any desired material may be fried during a broiling operation without reducing the efficiency of such broiling operation. However, it is to be understood that the upper surface of the heat shield may be used as a grill or cooking surface without the need of a broiling operation being performed within the roaster.

It is, therefore, obvious that the broiler or heater unit 11 performs a dual function, namely, enables food placed below such unit and within the roaster to be broiled or browned, and enables food to be grilled or fried upon the cooking surface of the heat shield either simultaneously with such broiling action or as a separate function of the unit.

Due to the heating action of the heater unit 11 while placed within the roaster 37 the interior temperature of the roaster will be increased sufficiently to enable it to be used immediately as a roaster. In such a case, the rack 1 and heater unit 11 are removed from the roaster and the trivet rack 37 may be introduced therein, permitting the roast or other desired material to be placed in such roaster and the cooking thereof done without the necessity of pre-heating the roaster 37.

Figure 9:
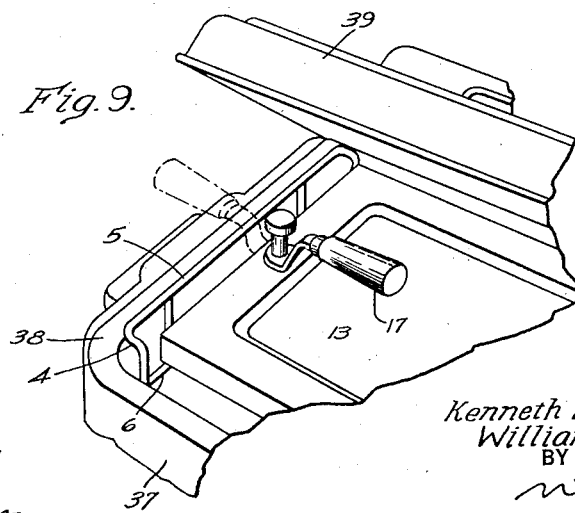
Fig. 9 is a view illustrating the method by which the lid may be placed in normal position upon the roaster with the heater unit and tray stored therein.

In storing the rack 1 and heater member 11 while not being used, such rack and heater may be placed within the roaster 37 along with the trivet rack 36. The handle 17 is then rotated approximately 180° so that such handle will be directly over the cooking surface of the heat shield 13, as shown in Fig. 9, whereupon the cover 39 may be located in its normal position upon the roaster without contacting such handle 17.

It is, therefore, obvious that in utilizing a rack and heater unit as hereinabove described in cooperation with a roaster, such heater unit may be used for either broiling or frying, or both simultaneously, and the excess heat from the heating element of such heater unit may be used to pre-heat the roaster, eliminating such requirement before starting the use thereof as a roaster. Also double layer baking with or without simultaneous frying may be accomplished.

Various modifications may be made in the device embodying our invention without departing from the spirit and scope thereof, and we desire, therefore, that only such limitations shall be placed thereon as are imposed by the prior art and the appended claims.

We claim as our invention:

1. A cooking device comprising the combination of an open top receptacle having a bottom wall and vertical walls encompassing the interior of the receptacle, and a broiler assembly adapted for use in said open top receptacle and comprising a rack adapted to be inserted and removed through the open top of said receptacle, a heating unit mounted on said rack adjacent the top of said receptacle, said heating unit comprising an exposed radiant heating element and a plate member above the heating element for reflecting heat downwardly, said heating unit radiating heat of sufficient intensity for broiling articles of food, and hinge means whereby said heating unit may be swung upwardly on said rack to provide access to articles below the heating unit.

2. In a cooking appliance including a cooking chamber, a cover therefor, a removable rack for use within the cooking chamber, said rack having a plurality of trivets thereon, a removable heater rack to be used within the cooking chamber, a rack shelf, means for adjustably mounting the shelf upon the heater rack, a removable heater unit swingably mounted upon the heater rack comprising a heat shield including a heat reflecting surface and a cooking surface, a radiant heating element insulatedly and removably mounted upon the heat shield and a handle rotatably mounted upon the heat shield whereby said handle may be rotated over the griddle surface permitting the cover to be placed upon the cooking chamber, and means for connecting the heating element to a power supply.

3. A cooking device comprising the combination of an open top receptacle having a bottom wall and vertical walls and a cover forming a substantially complete closure for the top of the open top receptacle, and a broiler assembly adapted for use in said receptacle and comprising a rack adapted to be inserted in said receptacle through the open top thereof, a heating unit carried by said rack adjacent the top of said receptacle, a shelf supported in the receptacle between the heating unit and said bottom wall, hinge means at one end of the heating unit whereby the same may be swung upwardly to provide access to articles on said shelf, and a handle rotatably mounted on the other end of the heating unit and adapted to be turned to overlie the heating unit to permit said cover to be positioned while the broiler assembly is disposed within said receptacle, or to be turned to project from the heating unit to provide a handle for swinging the heating unit upwardly.

4. A cooking device comprising the combination of an open top receptacle having a bottom wall and vertical walls, and a broiler assembly adapted for use in said open top receptacle and to be inserted and removed through the open top thereof, and comprising a rack, a heating unit supported in horizontal position on said rack adjacent the top of the rack and the top of said receptacle in such manner that the same may be swung upwardly about a horizontal axis, said heating unit comprising a radiant heating element and a heat reflecting member above the same, and a grill shelf adapted to be supported by said rack at different heights below said heating unit for supporting articles to be heated by said heating unit.

5. A cooking device comprising the combination of an open top receptacle having a bottom wall and vertical walls, a heating unit comprising a metal plate member and a heating element insulatedly attached thereto on the lower side, and means comprising a horizontal rod for supporting said heating unit in said receptacle adjacent the open top thereof, said metal plate member having downwardly extending flanges formed with slots of inverted L-shape to receive said rod, thereby providing a hinge connection about which the heating unit may be swung upwardly and which permits said heating unit to be readily removed.

6. The combination of a roaster including a receptacle or roaster body having a bottom wall and vertical side walls forming an open top receptacle, a removable cover forming a substantially complete closure for the open top of the roaster body, a shelf for supporting articles of food in the roaster body between the top and the bottom thereof, a heating unit comprising a metal plate member and a heating element insulatedly disposed on the lower side of said plate member, said heating element providing radiant heat of sufficient intensity for broiling articles of food on said shelf, and means for removably and hingedly supporting said heating unit adjacent the top of the roaster body, a portion of the periphery of the heating unit being spaced from a vertical wall of the roaster body to provide space for ventilation when said unit is disposed in its lowermost position.

7. The combination set forth in claim 6 wherein the parts are formed so that the cover may be placed in closed position while the heating unit remains within the roaster.

8. The combination with a roaster including a receptacle or roaster body having a bottom wall and vertical walls completely encompassing the interior of the roaster and a cover forming a substantially complete closure for the open top of the roaster body, of broiler equipment for use in said roaster body and including a rack readily insertable in and removable from the roaster body and having a shelf for supporting articles of food in the roaster body between the top and the bottom thereof, a heating unit comprising a metal plate member and a heating element insulatedly and removably attached to the lower side of said plate member, the upper surface of the plate member constituting a cooking surface and the lower surface serving to reflect heat from said heating element to articles placed on said shelf, means for removably and hingedly supporting said heating unit in the open top of the roaster body, the major portion of the periphery of the heating unit being spaced horizontally inwardly from the vertical walls of the roaster body to provide space for ventilation.

9. In combination, a removable rack comprising a plurality of upstanding support members having an outward offset in the upper portion thereof, longitudinal base members joining the upstanding members, means comprising a bar joining the offset portions of the end support members for lifting the rack, serpentine tray supports rigidly attached to the support members, and an intermediate bar attached to the end supports intermediate the offset portion and the serpentine tray supports; a slidable tray; and a removable heater unit swingably mounted upon the intermediate bar comprising a heat shield having an aperture therein, said heat shield including a heat reflecting surface, a cooking surface, and a hinge portion, a radiant heating element insulatedly and removably attached to the heat shield, and a handle rotatably mounted upon the heat shield.

10. The combination with a cooking vessel comprising a bottom, side and end walls and having an open top, a rack adapted to be disposed in and removably supported by said vessel and to be inserted through the open top of the receptacle, a heating unit hingedly supported on said rack adjacent the top of said vessel and including a heating element and a heat shield above the heating element, and a tray removably supported on said rack between said bottom wall and said heating element, said heating unit providing radiant heat of sufficient intensity to broil articles of food on said tray.

11. The combination with a cooking vessel having bottom, side and end walls and having an open top, of a rack disposed within said vessel and removably supported on the bottom wall thereof, a heating unit supported on said rack adjacent the top of said vessel and including an electric heating element, one end of said heating unit being hinged on one end of said rack and the other end resting on said rack so that said heating unit may be swung upwardly, and a tray supported on said rack intermediate said bottom wall and said heating unit for supporting articles to be heated by said heating element, said heating unit providing radiant heat of sufficient intensity to broil articles of food on said tray.

12. The combination with an open top receptacle, of a rack disposed therein and resting on the bottom thereof, a heating unit hingedly supported on said rack adjacent the top of the receptacle and adapted to be swung upwardly thereon, said unit comprising a plate member and a heating element beneath the plate member, the upper surface of the plate member constituting a cooking surface and the lower surface constituting a reflecting surface.

13. The combination with an open top receptacle, of a broiler assembly adapted to be disposed and supported in the receptacle and to be inserted in the receptacle through the open top thereof and comprising a rack, a heating unit hingedly supported in horizontal position on the rack adjacent the top of the receptacle, said heating unit comprising a heating element and a heat shield above the heating element, the upper surface of the heat shield constituting a cooking surface, and a shelf carried by the rack below the heating unit for supporting articles to be heated by radiant heat of said heating element, said heating unit being formed to provide space between the same and the receptacle for ventilation, and said heating unit being adapted to be swung upwardly about the hinged support to provide access to said shelf through the top of the receptacle.

14. A cooking appliance including a cooking chamber, a removable rack adapted to be disposed within said cooking chamber, a heating unit comprising a heat shield and a heating element insulatedly and detachably mounted on the lower side of the heat shield, said heat shield having hinge portions at one end for engaging the rack and the other end of the heat shield being adapted to rest on the rack and having a handle for swinging the heating unit upwardly about said hinge portions, and a shelf supported by the rack below the heating unit for supporting articles to be heated by said heating element, said heating unit providing radiant heat of sufficient intensity to broil articles of food on said shelf.

15. The combination with a receptacle comprising a bottom wall, two side walls and two end walls and open at the top, of a broiler grill assembly adapted to be removably disposed in said receptacle and comprising a rack adapted to rest on said bottom wall, said rack having four upright corner members and horizontal end members extending between the corner members at the respective ends and disposed adjacent the top of the receptacle, a shelf, means provided on the corner members for supporting the shelf thereon intermediate the top and the bottom of the receptacle, and a heating unit comprising a heating element and a member providing a heat reflecting surface above the heating element, one end of said heating unit being swingably and removably mounted on one horizontal end member and the other end of the heating unit being adapted to rest on the other horizontal end member.

16. The combination with a receptacle comprising a bottom wall, two side walls and two end walls and open at the top, of a broiler grill assembly adapted to be disposed in said receptacle and comprising a rack adapted to rest on said bottom wall, said rack having four upright corner members and horizontal end members extending between the corner members at the respective ends and disposed adjacent the top of the receptacle, a shelf, means provided on the corner members for supporting the shelf thereon intermediate the top and the bottom of the receptacle, a heating unit comprising a heating element and a member providing a heat reflecting surface above the heating element, one end of said heating unit being swingably and removably mounted on one horizontal end member and the other end of the heating unit being adapted to rest on the other horizontal end member, and a second horizontal end member carried by the upright corner members at said one end and adapted to engage the heating unit when it is swung slightly past vertical position whereby the heating unit may be maintained in substantially upright position.

17. A cooking appliance comprising the combination of a roaster including a receptacle or roaster body having a bottom wall and vertical walls completely encompassing the interior of the roaster and a cover forming a substantially complete closure for the open top of the roaster body, broiler equipment for use with said roaster body and including a rack readily insertable in and removable from the roaster body and having a shelf for supporting articles of food in the roaster body above the bottom thereof, a heating unit comprising an open radiant heating element and a plate member above the heating element for reflecting heat downwardly therefrom onto the shelf, and means for removably and hingedly supporting said heating unit adjacent and across the open top of the roaster body, a portion of the periphery of the heating unit being spaced horizontally inwardly from the vertical walls of the roaster body to provide sufficient space for ventilation.

18. The combination of a receptacle or roaster body having a bottom wall and vertical side walls and open at the top, a heating unit comprising a metal plate member and an open electric heating element insulatedly disposed on the lower side of said plate member, the lower surface of said plate member being adapted to reflect radiant heat from said heating element, means for removably and hingedly supporting said heating unit adjacent the top of the roaster body, said means including a support member removably supported on said roaster body and complementary hinge portions carried by said support member and said heating unit, respectively, to provide for upward swinging movement of the heating unit about a horizontal axis, and a shelf disposed between said heating unit and the bottom of said roaster body for supporting articles of food, said heating unit providing radiant heat of sufficient intensity for broiling articles of food on said shelf, and a portion of the periphery of said plate member being spaced from a vertical wall of the roaster body, when the heating unit is disposed in its lowermost position, to provide sufficient space for ventilation when broiling.

19. The combination set forth in claim 18, wherein the upper surface of said metal plate member comprises a substantially flat frying surface and a raised portion encompassing the same.

20. A broiling and frying assembly adapted to be disposed and used in an open top receptacle and consisting of a rack of open framework, said rack having upright corner posts, horizontal bars extending transversely of the rack at the ends thereof and connected to the upper ends of said corner posts, and longitudinal rods connecting the corner posts on the opposite sides of the rack; a heating unit removably and swingably mounted on said rack, said heating unit having along one edge spaced hinge portions formed with recesses adapted to engage one of said horizontal bars to permit upward swinging movement of the heating unit about said horizontal bar, said heating unit adjacent the opposite edge being adapted to rest directly on said rack adjacent the top thereof; a handle carried by said heating unit adjacent said opposite edge for effecting said swinging movement; a removable wire frame grill shelf; shelf support members carried by the upright members of the rack and supporting said shelf below said heating unit in spaced relation thereto; said heating unit comprising an open, electric, radiant heating element and a metal plate member on the upper side thereof, the lower surface of said plate member serving to reflect radiant heat downwardly, said heating unit providing sufficient radiant heat for broiling articles of food on said shelf.

21. A cooking appliance comprising an open top receptacle having a bottom wall and vertical walls encompassing the interior of the receptacle, a heating unit comprising a heating element and a sheet metal member above the heating element for reflecting radiant heat downwardly, means for removably and hingedly supporting said heating unit adjacent the top of said receptacle, a grill for supporting articles of food disposed between said heating unit and the bottom wall of said receptacle, the upper surface of said sheet metal member being formed to provide a central frying surface and a raised portion encompassing said central portion, and a drain opening formed in said frying surface and disposed above the bottom wall of said receptacle and spaced horizontally from any part of said heating element to avoid dripping food juices onto said heating element.

22. A cooking device as set forth in claim 1 wherein the plate member is formed on its upper side with a central frying surface and a raised portion encompassing said central frying surface.

WILLIAM JAMES RUSSELL.
KENNETH L. WOODMAN.

DISCLAIMER 2,156,216.—*William James Russell* and *Kenneth L. Woodman*, Mansfield, Ohio. BROILER AND FRYER UNIT. Patent dated April 25, 1939. Disclaimer filed December 6, 1940, by the assignee, *Westinghouse Electric & Manufacturing Company*.

Hereby enters this disclaimer to claims 6, 17, and 18 of said Letters Patent.
[*Official Gazette January 28, 1941.*]